United States Patent
Marco

(10) Patent No.: US 11,412,540 B2
(45) Date of Patent: Aug. 9, 2022

(54) DATA TRANSMISSION PRIORITIZATION IN USER EQUIPMENT IN A WIRELESS COMMUNICATION NETWORK

(71) Applicant: JRD Communication (SHENZHEN) LTD., Guangdong (CN)

(72) Inventor: Olivier Marco, Colombes (FR)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 0 days.

(21) Appl. No.: 16/970,371

(22) PCT Filed: Feb. 13, 2020

(86) PCT No.: PCT/CN2020/075013
§ 371 (c)(1),
(2) Date: Aug. 16, 2020

(87) PCT Pub. No.: WO2020/164530
PCT Pub. Date: Aug. 20, 2020

(65) Prior Publication Data
US 2021/0378005 A1 Dec. 2, 2021

Related U.S. Application Data

(60) Provisional application No. 62/805,715, filed on Feb. 14, 2019.

(51) Int. Cl.
*H04W 72/14* (2009.01)
*H04W 72/12* (2009.01)

(52) U.S. Cl.
CPC ....... *H04W 72/14* (2013.01); *H04W 72/1268* (2013.01)

(58) Field of Classification Search
CPC . H04W 72/1294; H04W 72/14; H04W 74/00; H04W 74/002; H04W 74/004
See application file for complete search history.

(56) References Cited

U.S. PATENT DOCUMENTS

2017/0318594 A1* 11/2017 Babaei ............... H04W 72/087
2018/0279358 A1 9/2018 Babaei et al.
(Continued)

FOREIGN PATENT DOCUMENTS

CN 102685914 A 9/2012
CN 108811117 A 11/2018
(Continued)

OTHER PUBLICATIONS

"The Impact of Processing Order of UL Grants on LCP", Samsung, 3GPP TSG RAN WG2 #99, R2-1709600, Aug. 25, 2017.
(Continued)

*Primary Examiner* — Dinh Nguyen
(74) *Attorney, Agent, or Firm* — PV IP PC; Wei Te Chung; Ude Lu

(57) ABSTRACT

Methods and systems for managing prioritisation and conflicts in a cellular communication network are provided. Mapping restrictions between logical channels and uplink grants are utilised. In a specific example there is disclosed a method of reducing collisions of uplink (UL) data transmissions from a UE of a wireless communication network to a base station of the wireless communication network, comprising the steps of generating an index for each of a plurality of configured UL grant configurations, modifying a logical channel mapping restrictions to include one or more of the configured UL grant configuration indexes, using the one or more configured UL grant configuration indexes to map the logical channel associated with the modified logical channel mapping restrictions parameter to one or more of the configured UL grant configurations, and using the one or more configured UL grant configurations for one or more of the UL data transmissions from the UE.

2 Claims, 9 Drawing Sheets

(56) References Cited

U.S. PATENT DOCUMENTS

2018/0367255 A1* 12/2018 Jeon .................... H04L 5/0053
2018/0368107 A1* 12/2018 Babaei ............... H04L 27/2608

FOREIGN PATENT DOCUMENTS

WO 2018/061438 A1 4/2018
WO 2018/171651 A1 9/2018

OTHER PUBLICATIONS

"Discussion on intra-UE multiplexing scenarios", CATT, 3GPP TSG RAN WG1 Ad-Hoc Meeting 1901, R1-1900337.
"E-mail discussion summary [103bis#41] [NR/IIoT] Intra-UE Prioritization (Nokia)", Nokia (Rapporteur), 3GPP TSG-RAN WG2 #104, R2-1817579.

* cited by examiner

US 11,412,540 B2

DATA TRANSMISSION PRIORITIZATION IN USER EQUIPMENT IN A WIRELESS COMMUNICATION NETWORK

CROSS-REFERENCE TO RELATED APPLICATIONS

This application is a National Stage of International patent application PCT/CN2020/075013, filed on Feb. 13, 2020, which claims priority to U.S. Provisional Patent Application No. 62/805,715, filed Feb. 14, 2019, the disclosures of which are incorporated by reference in their entirety.

TECHNICAL FIELD

The following disclosure relates to communication of data in a wireless network and more specifically to data transmission prioritization in user equipment in the network by reducing collisions of uplink data transmissions to improve data reliability and reduce latency.

BACKGROUND

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system.

In cellular wireless communication systems, User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN & CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) physical transmission format.

A trend in wireless communications is towards the provision of lower latency and higher reliability services. For example, NR is intended to support Ultra-reliable and low-latency communications (URLLC) and massive Machine-Type Communications (mMTC) are intended to provide low latency and high reliability for small packet sizes (typically 32 bytes). A user-plane latency of 1 ms has been proposed with a reliability of 99.99999%, and at the physical layer a packet loss rate of $10^{-5}$ or $10^{-6}$ has been proposed.

In NR networks, a UE may request resources whenever it has data to transmit on the uplink (UL), i.e. the communication link from the UE to a base station. The base station controls allocation of resources to UEs for UL transmissions and when a UE sends a resource request to the base station, the base station sends a UL grant indicating resource allocated to the UE for transmission of the data.

In NR, transmission of user data using a UE is realized, from a Layer 2 point of view, on a UL-SCH transport channel by the MAC entity. The MAC entity shall have an UL grant to transmit on the UL-SCH. An UL grant indicates time/frequency resources for transmission of a MAC PDU. The UL grant can be a dynamic UL grant, e.g. received dynamically on the Physical Download Control Channel (PDCCH) or received dynamically in a Random Access Response RAR, or a configured UL grant, e.g. configured semi-persistently by a Radio Resource Control (RRC). From an initial UL grant, the MAC entity may also generate additional, separate UL grants, for repeated transmission of the same MAC PDU, also called bundling operation.

In the description, to ease the understanding, additional/separated UL grants may be referred to as additional configured UL grant or additional dynamic UL grant depending if they were generated from a configured UL grant or a dynamic UL grant. However, such UL grants are not configured UL grant or dynamic UL grant but merely separate UL grant generated for the bundling operation. The configured UL grant or dynamic UL grant are only delivered from the UL grant reception entity of MAC. A so-called additional configured UL grant is part of the bundle of a configured UL grant. A so-called additional dynamic UL grant is part of the bundle of a dynamic UL grant.

In NR, collisions may occur between dynamic UL grants and configured UL grants, or between any such UL grants and UL grants generated from repetitions. The collision may happen in time/frequency or only in time (overlapping resources in time). Such collisions, if not handled, could lead to collisions of MAC PDU transmissions on the corresponding UL grants, which is generally not supported as it would require multiple transmission RF chains and would complicate the device design. The existing NR framework neither ensures full collision avoidance nor optimal (lower latency) behaviour. As NR develops, more use cases are considered, e.g. it is proposed in particular to support multiple active configurations of configured UL grants. This introduces additional collision cases. A solution is needed to reduce collisions of UL data transmissions associated with configured and dynamic UL grants, thereby prioritizing data transmissions in the UL from a UE in a network while ensuring QoS of UL flows of data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a first aspect of the invention there is provided a method of reducing collisions of UL data transmissions from a UE of a wireless communication network to a base station of the network, comprising in a HARQ entity of the UE: receiving UL grants associated with the UL data transmissions, generating separate additional UL grants for bundle transmission (repetitions or possibly new transmission) if bundling operation is configured, checking for a collision between a configured UL grant or additional configured UL grant and a dynamic UL grant or additional dynamic UL grant, and when a collision is identified, prioritizing the dynamic UL grant or additional dynamic UL grant and associated UL data transmission by ignoring the configured UL grant or additional configured UL grant and associated UL data transmission.

A collision may be identified when a PUSCH duration from the configured UL grant overlaps with a PUSCH duration from the dynamic UL grant.

The HARQ entity of the UE may identify a received configured UL grant as an initial configured UL grant for a bundle operation and generate additional configured UL grants for the bundle operation. The HARQ entity of the UE may then check for a collision between an initial configured UL grant and a dynamic UL grant, and when a collision is identified, prioritize the dynamic UL grant by ignoring the initial configured UL grant. The HARQ entity of the UE may then check for a collision between an additional configured UL grant and a dynamic UL grant, and when a collision is identified, prioritize the dynamic UL grant by ignoring the additional configured UL grant.

The HARQ entity of the UE may identify a received dynamic UL grant as an initial dynamic UL grant for a bundle operation and generate additional dynamic UL grants for the bundle operation. The HARQ entity of the UE may then check for a collision between a configured UL grant and an initial dynamic UL grant, and when a collision is identified, prioritize the initial dynamic UL grant by ignoring the configured UL grant. The HARQ entity of the UE may then check for a collision between a configured UL grant and an additional dynamic UL grant, and when a collision is identified, prioritize the additional dynamic UL grant by ignoring the configured UL grant.

The HARQ entity of the UE may identify a received configured UL grant as an initial configured UL grant for a bundle operation and generate additional configured UL grants for the bundle operation and may identify a received dynamic UL grant as an initial dynamic UL grant for a bundle operation and generate additional dynamic UL grants for the bundle operation. The HARQ entity of the UE may then check for a collision between an initial configured UL grant and an initial dynamic UL grant, and when a collision is identified, prioritize the initial dynamic UL grant by ignoring the initial configured UL grant. The HARQ entity of the UE may then check for a collision between an additional configured UL grant and an initial dynamic UL grant, and when a collision is identified, prioritize the initial dynamic UL grant by ignoring the additional configured UL grant. The HARQ entity of the UE may then check for a collision between an initial configured UL grant and an additional dynamic UL grant, and when a collision is identified, prioritize the additional dynamic UL grant by ignoring the initial configured UL grant. The HARQ entity of the UE may then check for a collision between an additional configured UL grant and an additional dynamic UL grant, and when a collision is identified, prioritize the additional dynamic UL grant by ignoring the additional configured UL grant.

By prioritizing some of the UL grants and associated UL data transmissions, prioritization of UL transmission of data from the UE associated with the UL grants is achieved.

According to a second aspect of the invention there is provided a UE configured to perform the method of the first aspect of the invention.

According to a third aspect of the invention there is provided a method of reducing collisions of UL data transmissions from a UE of a wireless communication network to a base station of the network, comprising generating an index for each of a plurality of configured UL grant configurations, modifying a LCH mapping restrictions parameter to include one or more of the configured UL grant configuration indexes, using the one or more configured UL grant configuration indexes to map a LCH associated with the LCH mapping restrictions parameter to one or more configured UL grant configurations, and using the one or more configured UL grant configurations for one or more of the UL data transmissions from the UE.

Modifying the LCH mapping restrictions parameter to include one or more of the configured UL grant configuration indexes may comprise adding a bitmap to the parameter to contain the one or more of the configured UL grant configuration indexes.

The method may generate an index of 1 for a first configured UL grant configuration, modify the LCH mapping restrictions parameter to include the configured UL grant configuration index 1, use the configured UL grant configuration index 1 to map a first LCH associated with the LCH mapping restrictions parameter to the first configured UL grant configuration, and use the first configured UL grant configuration for one or more of the UL data transmissions from the UE.

The method may generate an index of 2 for a second configured UL grant configuration, modify the LCH mapping restrictions parameter to include the configured UL grant configuration index 2, use the configured UL grant configuration index 2 to map a second LCH associated with the LCH mapping restrictions parameter to the second configured UL grant configuration, and use the second configured UL grant configuration for one or more of the UL data transmissions from the UE.

According to a fourth aspect of the invention there is provided a UE configured to perform the method of the third aspect of the invention.

According to a fifth aspect of the invention there is provided a method of reducing collisions of UL data transmissions from a UE of a wireless communication network to a base station of the network, comprising in a HARQ entity of the UE: receiving UL grants associated with new transmissions and for each of a plurality of bundles, receiving UL grants associated with bundle transmissions of the bundles and generating UL grants associated with bundle retransmissions of the bundles, checking for a collision between a first UL grant and a second UL grant, and when a collision is identified, assessing a priority of data associated with the first UL grant and a priority of data associated with the second UL grant and identifying a UL grant with a higher priority of data, and prioritizing the UL grant with the higher priority of data.

The first UL grant may be any of a dynamic UL grant for a new transmission, a dynamic UL grant for a bundle transmission, a dynamic UL grant for a bundle retransmission, a configured UL grant for a new transmission, a configured UL grant for a bundle transmission, a configured UL grant for a bundle retransmission. The second UL grant may be any of a dynamic UL grant for a new transmission, a dynamic UL grant for a bundle transmission, a dynamic UL grant for a bundle retransmission, a configured UL grant for a new transmission, a configured UL grant for a bundle transmission, a configured UL grant for a bundle retransmission.

The method may further comprise assessing a number of bundle retransmissions associated with the first UL grant and the second UL grant.

The method may further comprise, before checking for a between a first UL grant and a second UL grant, checking if there is data which can be transmitted using the first UL grant and the second UL grant.

According to a sixth aspect of the invention there is provided a UE configured to perform the method of the fifth aspect of the invention.

The invention provides a method of reducing collisions of UL data transmissions from a UE of a wireless communication network to a base station of the network, comprising generating a plurality of configured UL grant configurations each having a different periodicity, modifying a LCH mapping restrictions parameter to include a periodicity setting which sets a periodicity of a configured UL grant configuration allowed for UL data transmission, a minimum periodicity setting which sets a minimum periodicity of a configured UL grant configuration allowed for UL data transmission and a maximum periodicity setting which sets a maximum periodicity of a configured UL grant configuration allowed for UL data transmission, using the periodicity setting, the minimum periodicity setting and the maximum periodicity setting to map a LCH associated with the LCH mapping restrictions parameter to one or more configured UL grant configurations, and using the one or more configured UL grant configurations for one or more of the UL data transmissions from the UE.

It is proposed that when configuring bundle transmissions for a dynamic or configured UL grant, it is indicated whether the bundle transmission is allowed to be pre-empted or not (optionally, up to a given number of bundle transmissions). Such an indication could alternatively be part of the LCH configuration, in addition to the LCH priority. For instance, a LCH could be configured with a low priority, but not allowed to be pre-empted (in which case the bundle transmissions including this LCH are not allowed to be pre-empted).

Alternatively, or in addition, it is proposed to introduce an indication whether an UL grant (dynamic UL grant, e.g. as part of a DCI, or configured UL grant, as part of the configured grant configuration) is allowed or required to pre-empt an on-going bundle transmission. Such indication could be also part of the LCH configuration, in addition to LCH priority. For instance, a LCH could be configured with a high priority, but not allowed to pre-empt an on-going bundle transmission (even though this has a lower priority).

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

Figure 1:
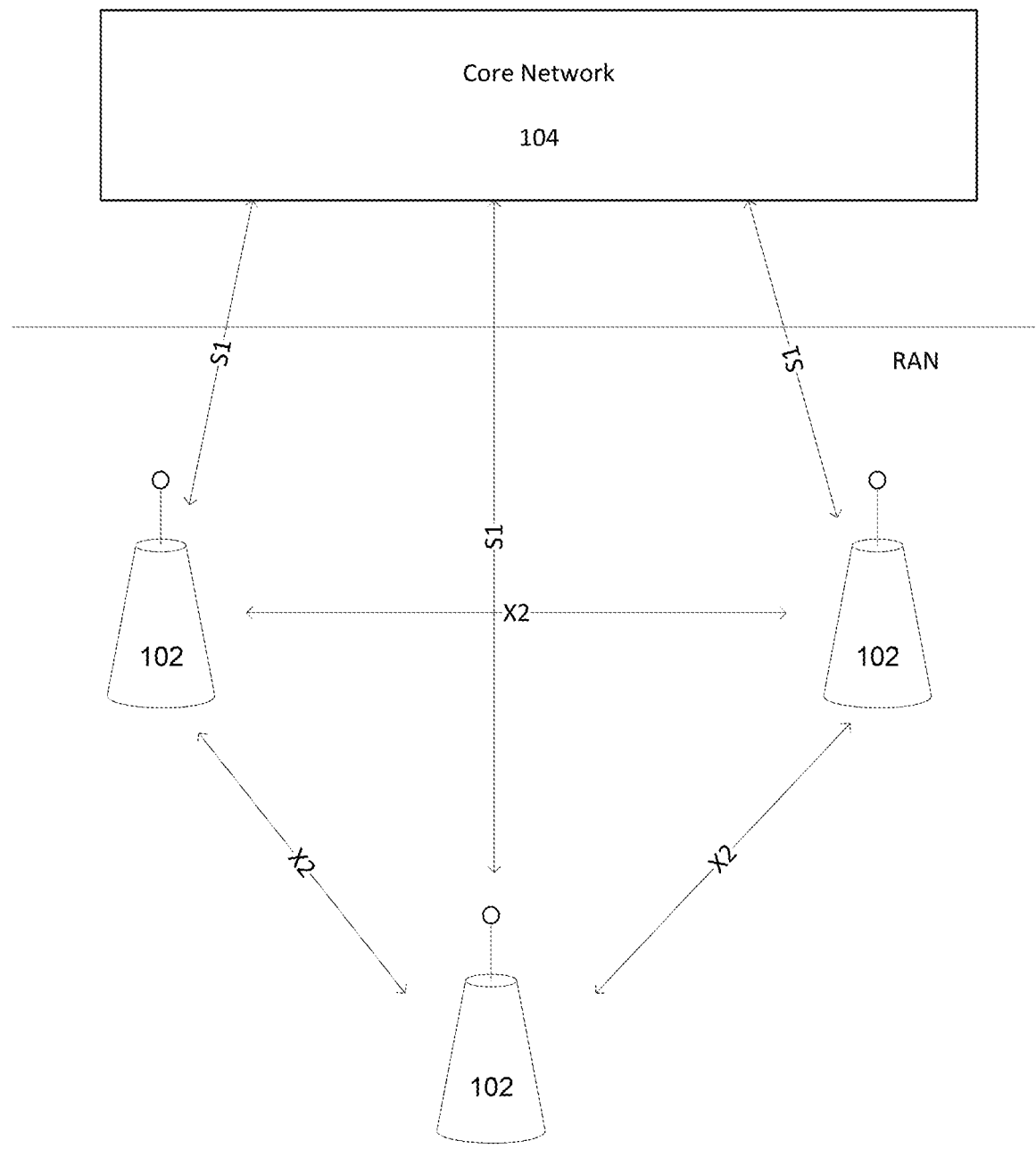
FIG. 1 shows a schematic representation of three base stations and associated UE forming a communications network.
Figure 2:
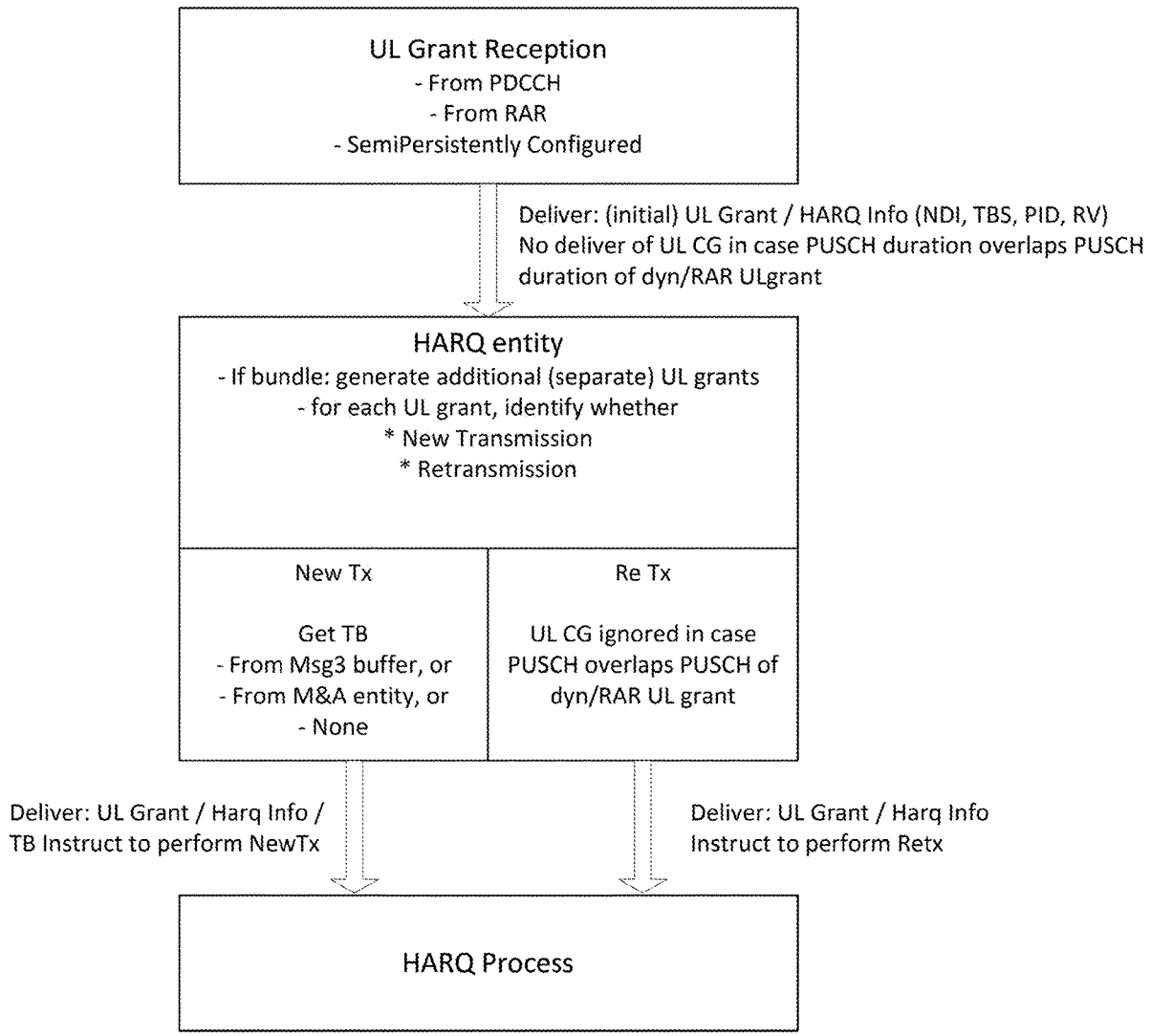
FIG. 2 shows a schematic representation of an existing, prior art NR framework for UL grant reception and HARQ entity operation, including UL grant collision handling.

FIG. 1 shows a schematic diagram of three base stations (for example, eNB or gNBs depending on the particular cellular standard and terminology) forming a cellular network. Typically, each of the base stations will be deployed by one cellular network operator to provide geographic coverage for UEs in the area. The base stations form a Radio Area Network (RAN). Each base station provides wireless coverage for UEs in its area or cell. The base stations are interconnected via the X2 interface and are connected to the core network via the S1 interface. As will be appreciated only basic details are shown for the purposes of exemplifying the key features of a cellular network.

The base stations each comprise hardware and software to implement the RAN's functionality, including communications with the core network and other base stations, carriage of control and data signals between the core network and UEs, and maintaining wireless communications with UEs associated with each base station. The core network comprises hardware and software to implement the network functionality, such as overall network management and control, and routing of calls and data.

Reducing collisions of UL data transmissions from a UE by prioritizing UL grants associated with the transmissions.

As stated, in NR, the MAC entity shall have a UL grant to transmit on the UL-SCH. The MAC Physical Data Unit (PDU) transmitted on the UL-SCH is referred to as a transport block (TB). The MAC entity can be configured for use of dynamic UL grant and/or configured UL grant and for bundle transmission. Bundle transmissions allow sending repetitions (retransmissions) of the same TB.

For both dynamic UL grant and configured UL grant, bundling transmission operation relies on a Hybrid Automatic Repeat Request (HARQ) entity for invoking the same HARQ process for each transmission that is part of the same bundle. Within a bundle, HARQ retransmissions are triggered without waiting for feedback from a previous transmission according to pusch-AggregationFactor for a dynamic UL grant and repK for a configured UL grant, respectively. Each transmission within a bundle requires a separate UL grant after the initial UL grant within the bundle is delivered to the HARQ entity.

Generally, for a given UL grant, the HARQ entity identifies the HARQ process involved, and whether a new transmission is triggered (in which a new TB will be generated, if data is available), or whether a retransmission is triggered (the same TB is retransmitted). The HARQ entity then instructs the HARQ process to perform a new transmission or a retransmission and delivers corresponding needed information.

One of the reasons for which, in NR, each transmission within a bundle is a separate UL grant, is to allow a new transmission for a UL grant (under specific conditions), not just retransmission. The bundle transmission mechanism allows commencement of a new transmission "during the bundle", on a RV0 occasion, to reduce latency (as it allows transmission without waiting for the start of the next bundle). Though, less repetitions are used in that case.

In NR, collision may occur between dynamic and configured UL grants and associated UL data transmissions. As a general rule, in the case of collision in the existing NR framework, priority is given to dynamic UL grants, by ignoring configured UL grants.

The existing, prior art NR framework for UL grant reception and HARQ entity operation, including UL grant collision handling is summarized in FIG. 1. In this framework, when there is collision between a dynamic UL grant and a configured UL grant (e.g. the Physical Uplink Shared Channel (PUSCH) transmission duration of the transmissions of the respective UL grants overlap), prioritization of the dynamic UL grant over the configured UL grant (e.g. semiPersistent UL grant) is realized by not delivering the configured UL grant (CG) from the UL grant reception entity to the HARQ entity.

An important point to note in this NR framework, is that before the operation "get TB" is performed by the HARQ entity (which requests a new TB in the case of a new transmission opportunity), it is not known whether an actual PUSCH transmission will take place or not for a given UL grant. This is why at the UL grant reception level, only PUSCH transmission duration overlaps can be referred to, while within the ReTx operation, the PUSCH of the retransmission can be referred to.

When bundle transmission is configured in the NR framework of FIG. 1, the HARQ entity handles bundle retransmissions of the TB by generating additional (separate) configured UL grants. Collision with dynamic UL grants is handled by ignoring configured UL grants for retransmission from the bundle in the case where the corresponding PUSCH transmission duration overlaps with the PUSCH transmission duration of a dynamic UL grant (or similarly if it overlaps with the PUSCH transmission duration the UL grant from a RAR).

The existing, prior art NR framework of FIG. 1 leads to several issues.

Figure 3:
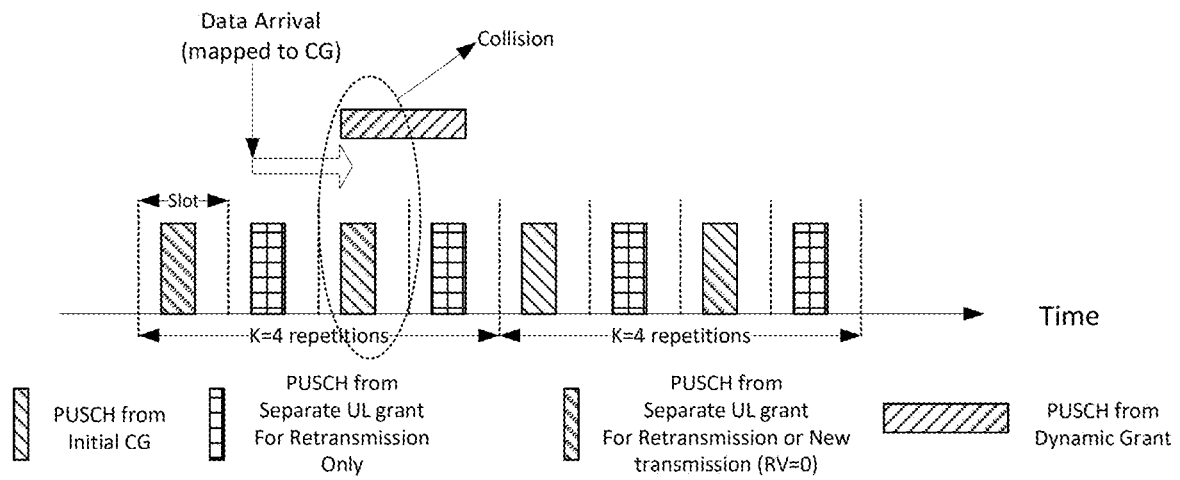
FIG. 3 shows a schematic representation of a first issue of the existing, prior art NR framework of FIG. 2.

A first issue is illustrated in FIG. 3. When a configured UL grant is delivered from the UL grant reception entity to the HARQ entity for a bundle transmission and repeated retransmissions of the TB of the bundle are configured, the HARQ entity generates separate configured UL grants that may be used for the initial TB transmission and the retransmissions. It is possible that the PUSCH transmission duration of such an initial transmission will overlap with PUSCH transmission duration of a dynamic UL grant. In such a case, collision may happen and the UE behaviour is not specified.

Figure 4:
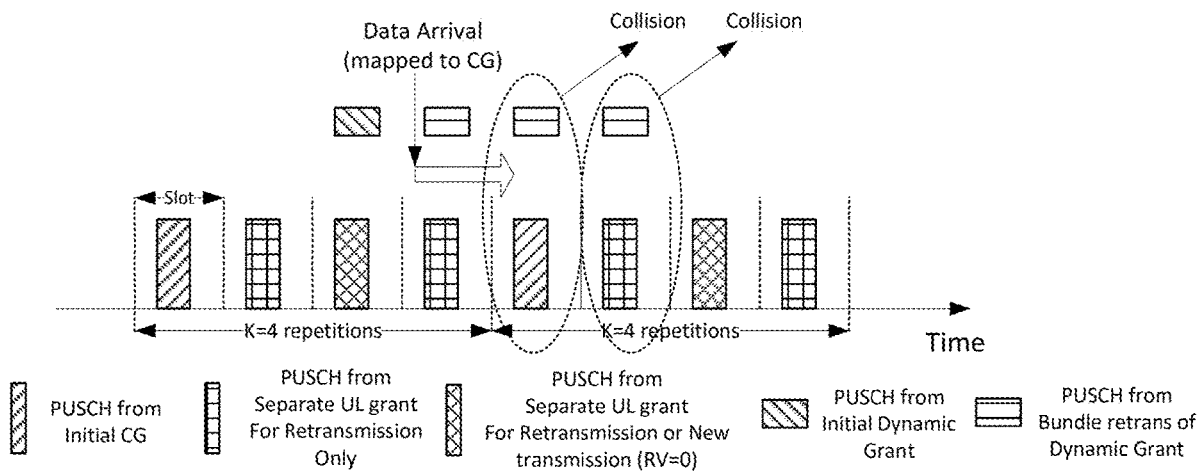
FIG. 4 shows a schematic representation of a second issue of the existing, prior art NR framework of FIG. 2.

A second issue is illustrated in FIG. 4. In the case where bundle transmission is configured with dynamic UL grant, the bundle retransmissions are handled by the MAC entity with separate UL grants. It is possible that the PUSCH transmission durations of the retransmissions from the bundle will overlap with the PUSCH transmission duration of a configured UL grant. In such a case, collision may happen and the UE behaviour is not specified.

Figure 5:
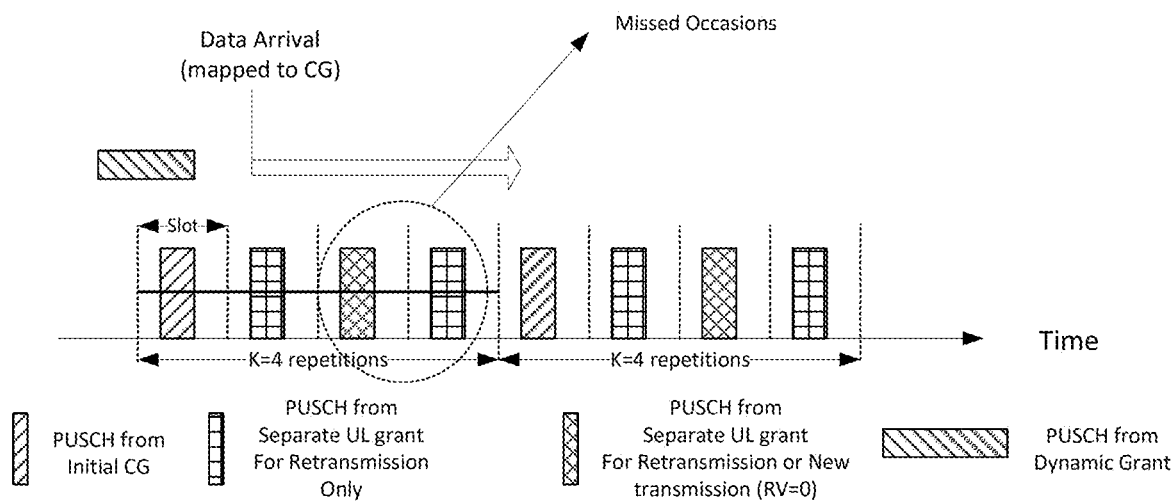
FIG. 5 shows a schematic representation of a third issue of the existing, prior art NR framework of FIG. 2.

A third issue is illustrated in FIG. 5. In the case where a PUSCH transmission duration of a configured UL grant overlaps with the PUSCH transmission duration of a dynamic UL grant, received by the UL grant reception entity on the PDCCH or in a RAR, the configured UL grant is not delivered to the HARQ entity. As a result, the HARQ entity cannot generate separate UL grants for the bundle transmissions of the configured UL grant, even though such transmissions could no longer overlap and could be used for an initial PUSCH transmission. In this case, the feature whereby a new transmission may be started during the bundle transmissions (in order to reduce latency) cannot be used.

The first aspect of the invention solves these issues by modifying the prior art NR framework for UL grant reception and HARQ entity operation, including UL grant collision handling.

The invention provides a method of reducing collisions of UL data transmissions from a UE of a wireless communication network to a base station of the network, comprising in a HARQ entity of the UE: receiving UL grants associated with the UL data transmissions, generating separate UL grants for bundle transmission (repetitions or possibly new transmission) if bundling operation is configured, checking for a collision between a configured UL grant or additional configured UL grant and a dynamic UL grant or additional dynamic UL grant, and when a collision is identified, prioritizing the dynamic UL grant or additional dynamic UL grant and associated UL data transmission by ignoring the configured UL grant or additional configured UL grant and associated UL data transmission.

Figure 6:
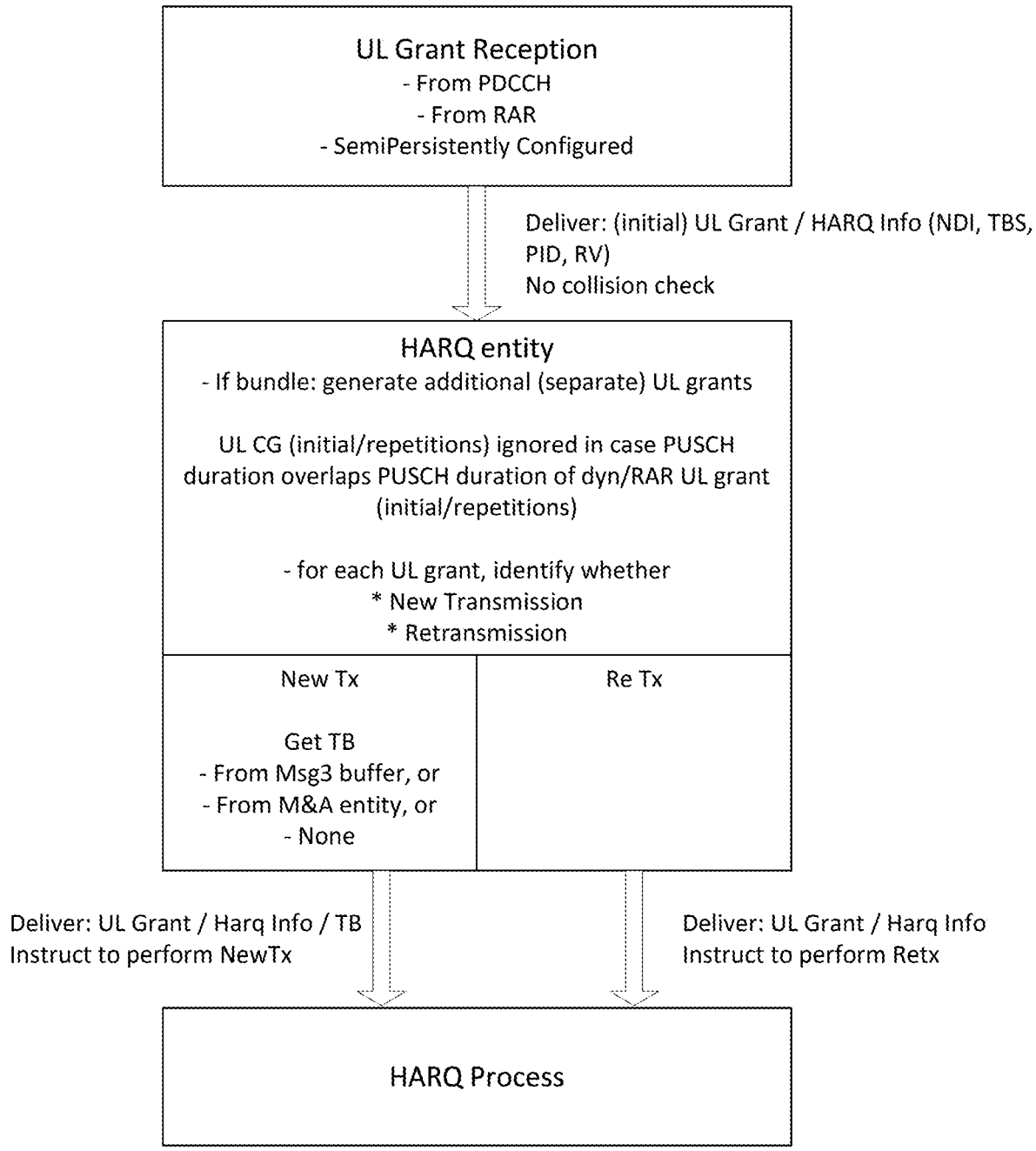
FIG. 6 shows a schematic representation of a first embodiment of a NR framework operating the first aspect of the invention for UL grant reception and HARQ entity operation, including UL grant collision handling.

FIG. 6 shows a schematic representation of a first embodiment of a NR framework for operating the method of reducing collisions of UL data transmissions from a UE by prioritizing UL grants described above. A UL grant reception entity of the UE receives the UL grants. These may be dynamic UL grants, e.g. received dynamically on the PDCCH between the UE and the base station or received dynamically in a RAR, or configured UL grants, e.g. configured semi-persistently by a RRC. The UL grant reception entity of the UE sends all of the UL grants to the HARQ entity of the UE, i.e. there is no filtering of the UL grants at this stage.

In this embodiment, the HARQ entity of the UE: receives the UL grants and if configured for bundle operation generate separate UL grants for bundle transmissions, check for collision between the UL grants and as a result perform an UL grant selection to resolve collision, and for each remaining UL grant identify new transmissions and retransmissions and deliver information to a HARQ process of the UE for performance of a new transmission or a retransmission.

The HARQ entity checks for a collision between a configured UL grant and a dynamic UL grant, and when a collision is identified, prioritizes the dynamic UL grant and associated UL data transmission by ignoring the configured UL grant and associated UL data transmission. A collision is identified when a PUSCH duration from the configured UL grant overlaps with a PUSCH duration from the dynamic UL grant.

When the HARQ entity of the UE identifies a received configured UL grant as an initial configured UL grant for a bundle operation, it generates additional configured UL grants for the bundle operation. The HARQ entity of the UE then checks for a collision between an initial configured UL grant and a dynamic UL grant, and when a collision is identified, prioritizes the dynamic UL grant by ignoring the initial configured UL grant. The HARQ entity of the UE then checks for a collision between an additional configured UL grant and a dynamic UL grant, and when a collision is identified, prioritizes the dynamic UL grant by ignoring the additional configured UL grant.

When the HARQ entity of the UE identifies a received dynamic UL grant as an initial dynamic UL grant for a bundle operation, it generates additional dynamic UL grants for the bundle operation. The HARQ entity of the UE then checks for a collision between a configured UL grant and an initial dynamic UL grant, and when a collision is identified, prioritizes the initial dynamic UL grant by ignoring the configured UL grant. The HARQ entity of the UE then checks for a collision between a configured UL grant and an additional dynamic UL grant, and when a collision is identified, prioritizes the additional dynamic UL grant by ignoring the configured UL grant.

When the HARQ entity of the UE identifies a received configured UL grant as an initial configured UL grant for a bundle operation, it generates additional configured UL grants for the bundle operation and identifies a received dynamic UL grant as an initial dynamic UL grant for a bundle operation, it generates additional dynamic UL grants for the bundle operation.

The HARQ entity of the UE then checks for a collision between an initial configured UL grant and an initial dynamic UL grant, and when a collision is identified, prioritizes the initial dynamic UL grant by ignoring the initial configured UL grant. The HARQ entity of the UE checks for a collision between an additional configured UL grant and an initial dynamic UL grant, and when a collision is identified, prioritizes the initial dynamic UL grant by ignoring the additional configured UL grant. The HARQ entity of the UE checks for a collision between an initial configured UL grant and an additional dynamic UL grant, and when a collision is identified, prioritizes the additional dynamic UL grant by ignoring the initial configured UL grant. The HARQ entity of the UE checks for a collision between an additional configured UL grant and an additional dynamic UL grant, and when a collision is identified, prioritizes the additional dynamic UL grant by ignoring the additional configured UL grant.

For each UL grant, the HARQ entity then identifies whether a UL data transmission associated with the UL grant will be a new transmission (i.e. has an associated configured UL grant or dynamic UL grant or initial configured UL grant or initial dynamic UL grant) or a bundle retransmission (i.e. has an associated additional configured UL grant or additional dynamic UL grant). When the UL data transmission is a new transmission, the HARQ entity gets the TB and delivers the UL grant, HARQ information and the TB to a HARQ process for performance of the new transmission. When the UL data transmission is a bundle retransmission, the HARQ entity delivers the UL grant and the HARQ information to a HARQ process for performance of the retransmission.

Figure 7:
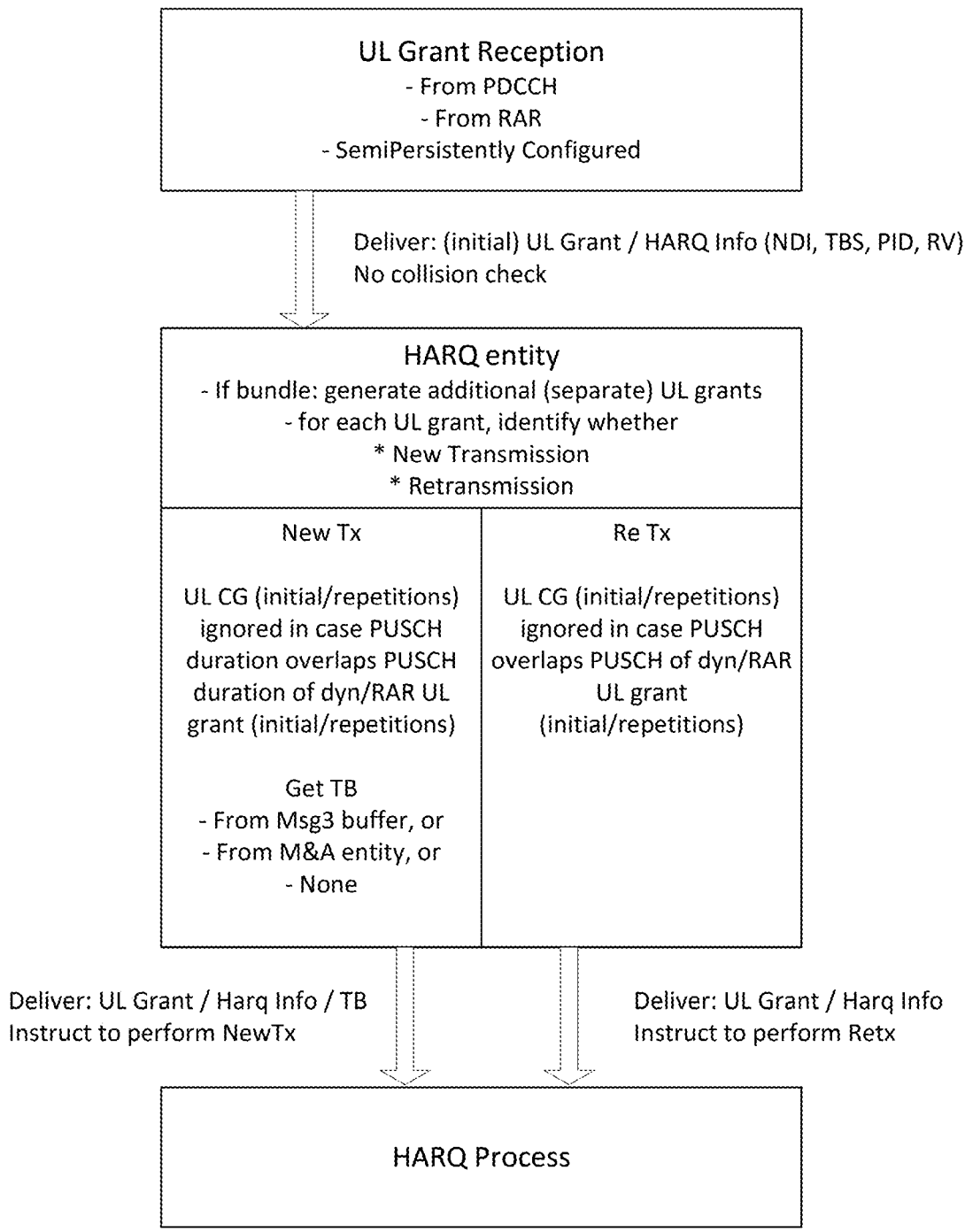
FIG. 7 shows a schematic representation of a second embodiment of a NR framework operating the first aspect of the invention for UL grant reception and HARQ entity operation, including UL grant collision handling.

FIG. 7 shows a schematic representation of a second embodiment of a NR framework for operating the method of reducing collisions of UL data transmissions from a UE by prioritizing UL grants described above. A UL grant reception entity of the UE receives the UL grants. These may be dynamic UL grants or configured UL grants. The UL grant reception entity of the UE sends all of the UL grants to the HARQ entity of the UE, i.e. again there is no filtering of the UL grants at this stage.

In this embodiment, the HARQ entity of the UE receives the UL grants and operates to identify UL grants for bundle operations, identify new transmissions and bundle retransmissions, check for collision between the UL grants and deliver information to a HARQ process of the UE for performance of a new transmission or a bundle retransmission.

When the HARQ entity identifies a received configured UL grant as an initial configured UL grant for a bundle operation, it generates additional configured UL grants for the bundle operation. When the HARQ entity identifies a received dynamic UL grant as an initial dynamic UL grant for a bundle operation, it generates additional dynamic UL grants for the bundle operation.

For each UL grant, the HARQ entity then identifies whether a UL data transmission associated with the UL grant will be a new transmission (i.e. has an associated configured UL grant or dynamic UL grant or initial configured UL grant or initial dynamic UL grant) or a bundle retransmission (i.e. has an associated additional configured UL grant or additional dynamic UL grant).

For new transmissions, the HARQ entity checks for a collision between a configured UL grant (initial or additional/repetition) and a dynamic UL grant (initial or additional/repetition), and when a collision is identified, prioritizes the dynamic UL grant and associated UL data transmission by ignoring the configured UL grant and associated UL data transmission. A collision is identified when a PUSCH duration from the configured UL grant overlaps with a PUSCH duration from the dynamic UL grant.

For bundle retransmissions, the HARQ entity checks for a collision between a configured UL grant (initial or additional/repetition) and a dynamic UL grant (initial or additional/repetition), and when a collision is identified, prioritizes the dynamic UL grant and associated UL data transmission by ignoring the configured UL grant and associated UL data transmission. A collision is identified when a PUSCH from the configured UL grant overlaps with a PUSCH from the dynamic UL grant.

When the data transmission is a new transmission, the HARQ entity gets the TB and delivers the UL grant, HARQ information and the TB to a HARQ process for performance of the new transmission. When the data transmission is a bundle retransmission, the HARQ entity delivers the UL grant and the HARQ information to a HARQ process for performance of the retransmission.

In this method of the invention, the configured UL grants (CG) are always delivered from the UL grant reception entity of the UE to the HARQ entity, even in case of collision with a dynamic UL grant, i.e. filtering of configured UL grants between the UL grant reception entity and the HARQ entity is removed.

The HARQ entity of the UE handles collisions between UL grants for all collisions cases. This enables centralization of collision decisions in a single entity, the HARQ entity, at the MAC level. This also enables a more similar behaviour between the handling of collisions for new transmissions and retransmissions.

This method of the invention allows following of a rule agreed for NR Rel-15, i.e. in the case of collision between a dynamic UL grant and a configured UL grant, the priority is given to the dynamic UL grant and the configured UL grant is ignored. Similarly, in the case of collision between a dynamic UL grant and an initial or additional configured UL grant of a bundle, the priority is given to the dynamic UL grant and the initial or additional configured UL grant is ignored.

In this method of the invention, this rule is extended to cases where bundle transmission is configured for a dynamic UL grant. In the case where bundle transmission is configured for a dynamic UL grant, and a collision occurs between an initial or additional dynamic UL grant of the bundle and a configured UL grant, or between an initial or additional dynamic UL grant of the bundle and an initial or additional configured UL grant of a bundle, the method prioritizes the retransmission in the bundle of the dynamic UL grant and ignores the configured UL grant, or the initial or additional configured UL grant of a bundle.

In the method of the invention described above, prioritization of transmission of data from the UE is achieved by reducing collisions of UL data transmissions from the UE using UL grant is prioritization. This enables collision-free handling of UL grants within the UE and optimal latency for URLLC traffic on configured UL grants.

Reducing collisions of UL data transmissions from a UE by enhancing LCH mapping.

Consider a scenario in which a UE of a wireless communications network has to support flows with different QoS characteristics. A common scenario for Industrial IoT (IIoT) would be periodic traffic with different periodicity/latency. The traffic flow with higher period/latency would typically have higher message size. It is also possible for traffic flows to be sporadic (non-periodic), with different short latency requirements. Short latency is typically supported by configured UL grants. Different latency requirements would map to different configured UL grant periodicities.

For such cases, it is advantageous for the network to configure multiple configured UL grant configurations. Moreover, it is beneficial to be able to configure overlapping configurations, as this can help to reduce the overhead in reserved resources. In IIoT, it is proposed to support multiple active configured UL grant configurations for at least 2 use cases: 1. reduce latency for a given traffic QoS, while ensuring the configured K repetitions in bundle transmissions can always be transmitted, and 2. better support of traffic flows with different characteristics.

By enhancing LCH mapping restrictions, it is possible to have a better handling of use case 2. In the prior art, maxPUSCH-Duration enables a LCH to be mapped only to UL grants with a PUSCH-Duration lower than maxPUSCH-Duration. This allows only a limited mapping of LCH towards configured UL grants.

In a scenario where a UE has two UL traffic flows (carried over LCH1 and LCH2), with latency requirements L and 2*L, this can be supported by multiple configured UL grants (CG1 and CG2), with periodicities P=L and 2*P. However, here the latency is not directly related to PUSCH duration but to the periodicity of the configured UL grant. The different configured UL grants may have the same PUSCH duration.

Further, in the prior art, it is not possible to map LCH1 and/or LCH2 to one of CG1/CG2. As a result, an incoming packet from LCH1 occurring just before a CG2 opportunity may use such an opportunity. This is not a problem if there is no LCH2 packet pending. If there is already an LCH2 pending, an LCP algorithm will determine how CG2 is used, depending of LCH1 and LCH2 relative priorities. However, assuming the size of the configured UL grants are adapted to the packets on LCH1 and LCH2, this would lead to segmentation of traffic.

As can be seen, it is desirable to be able to enhance LCH mapping restrictions.

The invention provides a method of reducing collisions of UL data transmissions from a UE of a wireless communication network to a base station of the network, comprising generating an index for each of a plurality of configured UL grant configurations, modifying a LCH mapping restrictions parameter to include one or more of the configured UL grant configuration indexes, using the one or more configured UL grant configuration indexes to map a LCH associated with the LCH mapping restrictions parameter to one or more configured UL grant configurations, and using the one or more configured UL grant configurations for one or more of the UL data transmissions from the UE.

Modifying the LCH mapping restrictions parameter to include one or more of the configured UL grant configuration indexes can comprise adding a bitmap to the parameter to contain the one or more of the configured UL grant configuration indexes.

The method may generate an index of 1 for a first configured UL grant configuration, modify the LCH mapping restrictions parameter to include the configured UL grant configuration index 1, use the configured UL grant configuration index 1 to map a first LCH associated with the LCH mapping restrictions parameter to the first configured UL grant configuration, and use the first configured UL grant configuration for one or more of the UL data transmissions from the UE.

The method may generate an index of 2 for a second configured UL grant configuration, modify the LCH mapping restrictions parameter to include the configured UL grant configuration index 2, use the configured UL grant configuration index 2 to map a second LCH associated with the LCH mapping restrictions parameter to the second configured UL grant configuration, and use the second configured UL grant configuration for one or more of the UL data transmissions from the UE.

The invention provides a method of reducing collisions of UL data transmissions from a UE of a wireless communication network to a base station of the network, comprising generating a plurality of configured UL grant configurations each having a different periodicity, modifying a LCH mapping restrictions parameter to include a periodicity setting which sets a periodicity of a configured UL grant configuration allowed for UL data transmission, a minimum periodicity setting which sets a minimum periodicity of a configured UL grant configuration allowed for UL data transmission and a maximum periodicity setting which sets a maximum periodicity of a configured UL grant configuration allowed for UL data transmission, using the periodicity setting, the minimum periodicity setting and the maximum periodicity setting to map a LCH associated with the LCH mapping restrictions parameter to one or more configured UL grant configurations, and using the one or more configured UL grant configurations for one or more of the UL data transmissions from the UE.

Variants of the method comprise instead of considering the periodicity of the configured UL grant configurations, it is possible to consider periodicity of possible initial transmissions.

In NR Rel-15, in bundle operations, repetitions (retransmissions of a TB) can be configured in addition with the initial transmission of the TB. This allows the UE to transmit the same TB a number of times, possibly with different RV. In order to reduce latency, the initial transmission may occur at RV=0 opportunities (with the drawback that the TB will be transmitted with less repetitions, which can impact the reliability). The periodicity of such RV=0 opportunities can be used to reflect the minimum latency allowed by the configuration instead of the configured UL grant configurations periodicity.

In NR Rel-16, it is envisaged using multiple configured UL grant configurations to allow the UE to transmit the maximum number of repetitions, irrespective of the arrival time of data. For this kind of configuration, the periodicity could correspond to the time difference between the possible transmission start on one configured UL grant configuration and the possible transmission start on the next configured UL grant configuration. Equivalently, the periodicity is equal to an individual configured UL grant configuration periodicity P divided by the number of configured UL grant configurations in the set (number of possible starting times within P).

Enhancement of LCH mapping restrictions is expected to reduce the potential collisions between UL grants and associated UL data transmissions. Indeed, it is expected collisions between UL grants will be considered only UE has pending data which can be transmitted (mapped) on the UL grants. By enhancing LCH mapping restriction, the possible mapping of such pending data on an UL grant is reduced hence the potential collisions are reduced. This reduces collision cases and optimizes UL traffic transmission in the case of different traffic flow characteristics.

Reducing collisions of UL data transmissions from a UE by enhancing the handling of collisions for bundle transmissions.

For new transmissions from a UE, the following UL grants can be received by the UE:dynamic UL grants (e.g. from a PDCCH or from a RAR) and configured UL grants. Different types of UL grant collisions may happen: dynamic UL grant for new transmission/dynamic UL grant for new transmission, configured UL grant for new transmission/configured UL grant for new transmission, dynamic UL grant for new transmission/configured UL grant for new transmission.

In bundle transmission of data by the UE, there is a transmission of a TB followed by a number of retransmissions (or repetitions) of the TB. The transmission and each of the retransmissions each have an associated UL grant, either all configured UL grants or all dynamic UL grants. The UL grant for the transmission is received by the UE from a base station and the UL grants for the retransmissions are generated by e.g. the MAC entity of the UE. This leads to further types of UL grant collisions which may happen.

A solution is needed to handle correctly bundle transmission collisions.

The invention provides a method of reducing collisions of UL data transmissions from a UE of a wireless communication network to a base station of the network, comprising in a HARQ entity of the UE: receiving UL grants associated with new transmissions and for each of a plurality of bundles, receiving UL grants associated with bundle transmissions of the bundles and generating UL grants associated with bundle retransmissions of the bundles, checking for a collision between a first UL grant and a second UL grant, and when a collision is identified, assessing a priority of data associated with the first UL grant and a priority of data associated with the second UL grant and identifying a UL grant with a higher priority of data, and prioritizing the UL grant with the higher priority of data.

The first UL grant may be any of a dynamic UL grant for a new transmission, a dynamic UL grant for a bundle transmission, a dynamic UL grant for a bundle retransmission, a configured UL grant for a new transmission, a configured UL grant for a bundle transmission, a configured UL grant for a bundle retransmission. The second UL grant may be any of a dynamic UL grant for a new transmission, a dynamic UL grant for a bundle transmission, a dynamic UL grant for a bundle retransmission, a configured UL grant for a new transmission, a configured UL grant for a bundle transmission, a configured UL grant for a bundle retransmission.

The method may further comprise assessing a number of bundle retransmissions associated with the first UL grant and the second UL grant.

The method may further comprise, before checking for a between a first UL grant and a second UL grant, checking if there is data which can be transmitted using the first UL grant and the second UL grant.

In order to handle correctly bundle transmission and retransmission collisions, UL grant selection is performed in the HARQ entity, i.e. there is no collision handling (filtering) of UL grants before such UL grants are handled by the HARQ entity and UL grants associated with bundle retransmissions are generated.

Figure 8:
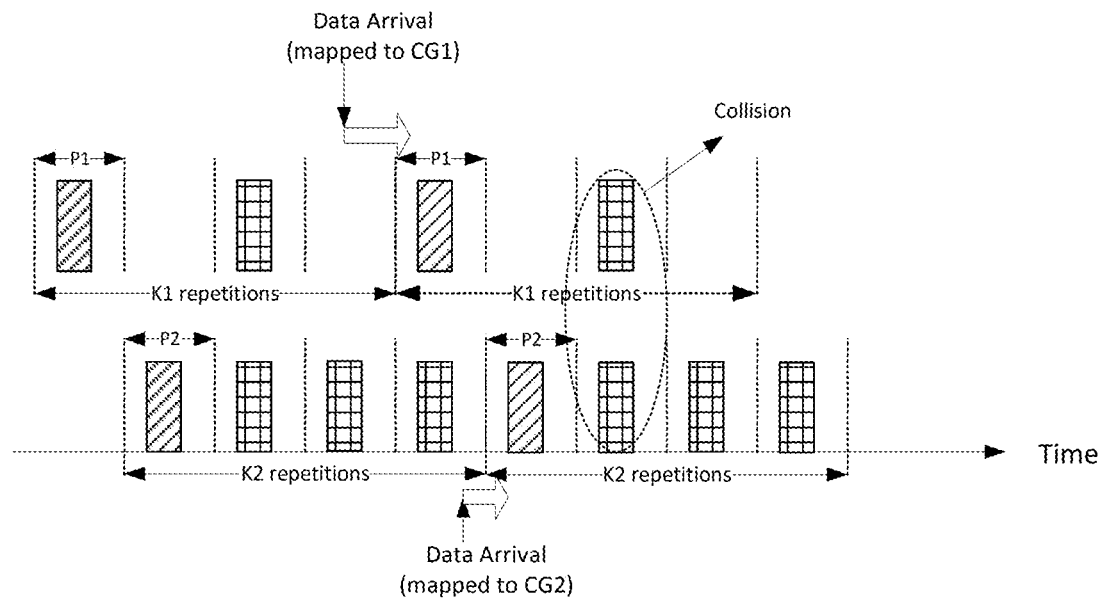
FIG. 8 shows a schematic representation of a collision between a UL grant for a retransmission of a first bundle and a UL grant for a retransmission of a second bundle.

FIG. 8 shows a schematic representation of a collision between a UL grant for a retransmission of a first bundle and a UL grant for a retransmission of a second bundle. The figure shows the collision for configured UL grants, but is also applicable dynamic UL grants. In this embodiment, the prioritized UL grant is decided using the highest priority of data effectively transmitted in the retransmission of both bundles.

Figure 9:
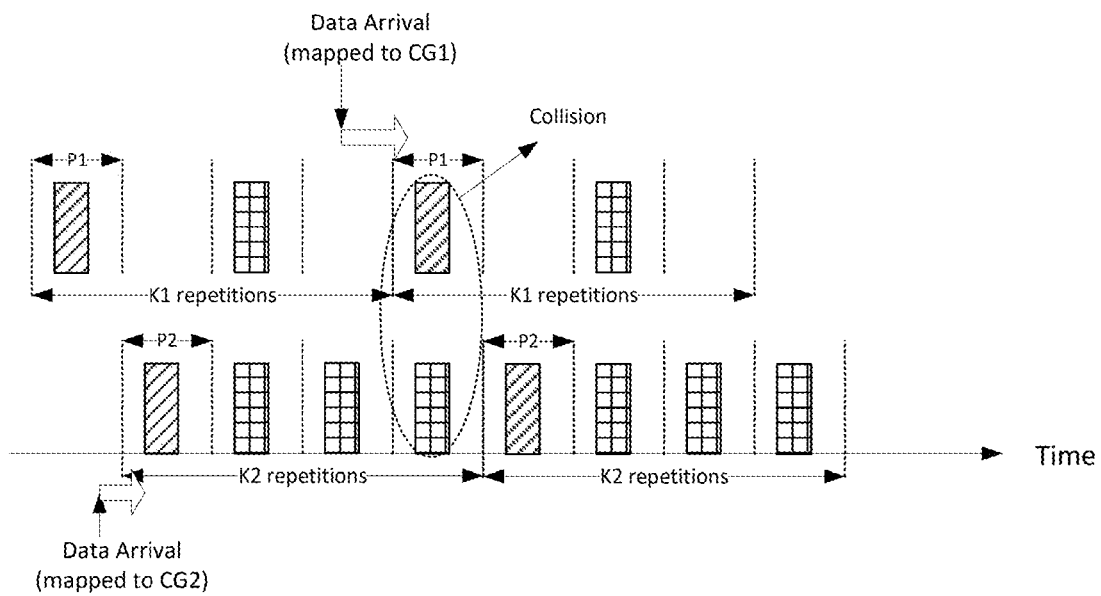
FIG. 9 shows a schematic representation of a collision between a UL grant for a retransmission of a bundle and a UL grant for a new transmission.

FIG. 9 shows a schematic representation of a collision between a UL grant for a retransmission of a bundle and a UL grant for a new transmission. The figure shows the collision for configured UL grants, but is also applicable dynamic UL grants. In this embodiment, the prioritized UL grant is decided using the highest priority of data effectively transmitted in the retransmission of the bundle versus the highest priority of data which can be transmitted in the UL grant for the new transmission.

In case of equal priority, the UL grant for the retransmission from the bundle should have priority. In particular, in order to support using multiple configured UL grants for latency reduction, new arriving data shall not pre-empt retransmission of previous data. When bundle retransmission is interrupted by a new transmission, the reliability of the transmission of the bundle is impaired. Indeed, stopping the bundle retransmission before sending the configured amount of retransmission could lead to a failed bundle transmission. This could be the case for instance if the physical layer is using retransmissions to transmit over different beams, and only some retransmissions can effectively be used by the UE. In addition, this could be seen as a waste of the radio resource.

In both embodiments, it is possible that several UL grants fulfil the UL grant prioritization requirement. For instance, a given LCH with a given data priority might be allowed to be transmitted (though LCH mapping restrictions) to several colliding UL grants. In such a case, priority could be given to the UL grant with the largest TB. In an alternative, priority could be given to the UL grant which can accommodate other LCHs with highest data priority.

In the case where there is no data to be transmitted, the UE may not use a UL grant (UL skipping). When transmissions are sporadic, only a very small fraction of configured UL grants is actually used for transmission. This means that the base station does not know when data is actually sent—it has to detect it. If a bundle was pre-empted, there are two main cases: the base station may have detected the transmission, in which case a usual HARQ mechanism can be used (e.g. the base station can ask for retransmissions), or the base station may not have detected the transmission, in which case the HARQ mechanism is useless. In NR, an "assume ACK" scheme is used for configured UL grants, by which upon sending a new transmission, the UE will assume that it is ACKed (at a HARQ level) upon a configured UL grant timer expiry, if it has not received a retransmission request by the base station before expiry. This assumes that the base station can very efficiently detect the transmission, since in the case of missed detection, the UE will consider that the TB was successfully transmitted at the HARQ level.

As it can be seen, there is a potential important issue when a bundle is pre-empted. To solve this issue, it could be configured whether to retransmit the TB. This configuration could use a threshold on the number of retransmissions effectively transmitted (or equivalently pre-empted from transmission). This is especially useful for configured grants for which the TB size is fixed, and hence MAC entity could retransmit the TB. For instance, assuming 8 repetitions are configured, it could be configured that only 1 or 2 repetitions could be sent (due to pre-emption of later transmissions by higher priority transmission). The TB retransmission could be ensured by indicating a NACK for the considered HARQ process and stopping/resetting the configured UL grant timer, and, in addition, for configured grants, such TB retransmission on the next transmission occasion for the HARQ process (instead of using it for new transmission).

An alternative is that the TB retransmission is scheduled as a new transmission of the same TB, with the possible drawback of duplicate TBs at the receiver in case the pre-empted TB was successfully decoded. As duplicate removal can be handled by upper layers, this option is possible and may be based on upper layer configuration. An advantage of this option is that the TB retransmission scheduling does not have to be on the same HARQ process; hence it can be scheduled faster.

Due to the above problems, it may also be advantageous to not follow the baseline rule. It might be useful to allow a different behaviour, such as prioritizing bundle retransmissions in the case of newly arriving data, even though with higher data priority, could be handled effectively in a later UL grant. Given the different possible scenarios, this behaviour requires a specific configuration.

It is proposed that when configuring bundle transmissions for a dynamic or configured UL grant, it is indicated whether the bundle transmission is allowed to be pre-empted or not (optionally, up to a given number of bundle transmissions). Such an indication could alternatively be part of the LCH configuration, in addition to the LCH priority. For instance, a LCH could be configured with a low priority, but not allowed to be pre-empted (in which case the bundle transmissions including this LCH are not allowed to be pre-empted).

Alternatively, or in addition, it is proposed to introduce an indication whether an UL grant (dynamic UL grant, e.g. as part of a DCI, or configured UL grant, as part of the configured grant configuration) is allowed or required to pre-empt an on-going bundle transmission. Such indication could be also part of the LCH configuration, in addition to LCH priority. For instance, a LCH could be configured with a high priority, but not allowed to pre-empt an on-going bundle transmission (even though this has a lower priority).

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method of reducing collisions of uplink (UL) data transmissions from a UE of a wireless communication network to a base station of the wireless communication network, comprising one or more processors performing the steps of:
generating an index for each of a plurality of configured UL grant configurations,
modifying logical channel mapping restrictions to include one or more of the configured UL grant configuration indexes,
using the one or more configured UL grant configuration indexes to map a logical channel associated with the modified logical channel mapping restrictions to one or more of the configured UL grant configurations, and
using the one or more configured UL grant configurations for one or more UL data transmissions from the UE, the method further comprising: generating an index of 1 for a first configured UL grant configuration, modifying the logical channel mapping restrictions to include the configured UL grant configuration index of 1, using the configured UL grant configuration index of 1 to map a first logical channel associated with the logical channel mapping restrictions to the first configured UL grant configuration, and using the first configured UL grant configuration for one or more of the UL data transmissions from the UE; and generating an index of 2 for a second configured UL grant configuration, modifying the logical channel mapping restrictions to include the configured UL grant configuration index of 2, using the configured UL grant configuration index of 2 to map a second logical channel associated with the logical channel mapping restrictions to the second configured UL grant configuration, and using the second configured UL grant configuration for one or more of the UL data transmissions from the UE.

2. The method according to claim 1, wherein modifying the logical channel mapping restrictions to include one or more the configured UL grant configuration indexes comprises adding a bitmap to the restrictions to contain the one or more of the included configured UL grant configuration indexes.

\* \* \* \* \*